Nov. 30, 1965      J. WERNER      3,220,763
CANOPY FRAME FOR A SLIDING PANEL OF A VEHICLE
Filed July 9, 1963
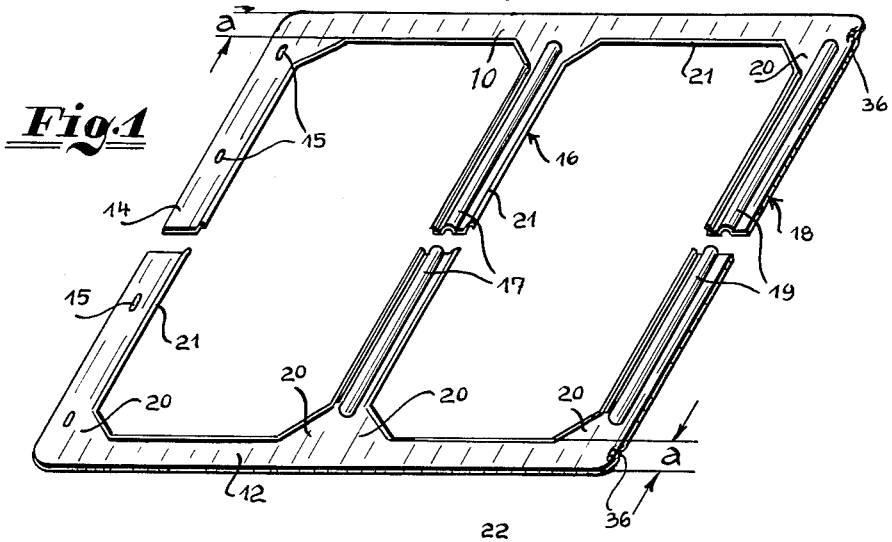
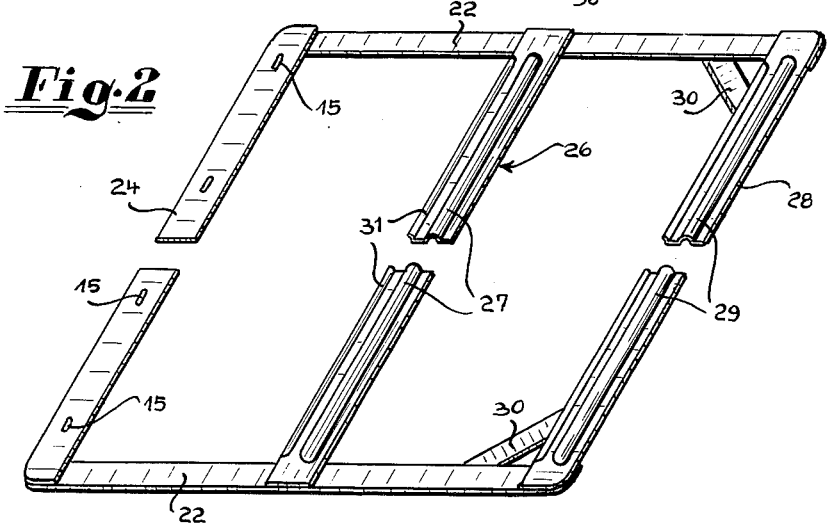
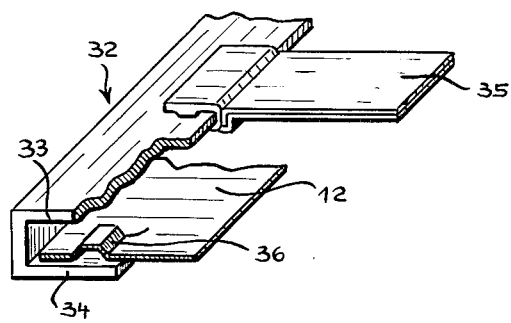

United States Patent Office 3,220,763
Patented Nov. 30, 1965

3,220,763
CANOPY FRAME FOR A SLIDING PANEL OF A VEHICLE
Johannes Werner, Offenbach am Main, Germany, assignor to H. T. Golde G.m.b.H. & Co. K.G., Frankfurt am Main, Germany
Filed July 9, 1963, Ser. No. 293,640
Claims priority, application Germany, July 14, 1962, G 26,250
1 Claim (Cl. 296—137)

This invention relates to a canopy frame for a sliding panel of a motor vehicle.

More particularly the invention relates to a canopy frame for a sliding panel of a motor vehicle wherein the lower face of said frame is provided with a lining, for example of textile fabric, and wherein the frame is arranged to be longitudinally displaceable in lateral guides beneath the opening in the fixed roof. The canopy frame, which extends over the entire width of the roof opening, must be sufficiently rigid to prevent sagging which might disengage it from its lateral guides. It must also be capable of withstanding the tension of the lining. In order to obtain the requisite inherent rigidity for these purposes while at the same time keeping to the minimum overall height which is generally desired for sliding roof constructions, conventional canopy frames are made of sheet metal of from 2 to 3 mm. in thickness. According to applicant's prior U.S. Patent 2,973,990 a canopy frame is known in which only transverse members of the frame of relatively thin material are reinforced by U-section reinforcement bars fitted onto the transverse members after the frame has been fitted in the vehicle roof.

According to the present invention, there is provided a canopy frame for a sliding roof of a motor vehicle, comprising first and second substantially parallel, strip-like parts spaced apart and having respective major surfaces both facing in one general direction for extending along guides in the motor vehicle roof, third and fourth substantially parallel, strip-like parts connected to the first and second parts and forming, with the first and second parts, substantially a rectangle and having respective major surfaces both facing in said one general direction, for extending transversely of said guides, projecting portions of the fourth strip-like part as seen in cross section bent in said one general direction for stiffening said fourth strip-like part, and first and second flat, marginal portions of said first and second parts, respectively, extending along outer edges of said first and second parts for extending within said guides. It has been found that material thicknesses of at most 1.25 mm. give this frame satisfactory inherent rigidity. The present frame is particularly suitable for mass production because it fulfils the need for reducing time spent at the assembly line in motor car factories, and also allows savings in material and a considerable reduction in weight as compared with the known frames.

In order that the invention may be clearly understood and readily carried into effect, reference will now be made, by way of example, to the accompanying drawings, wherein:

FIGURE 1 shows a top perspective view of a canopy frame for a sliding panel of a motor vehicle, FIGURE 2 shows a view similar to FIGURE 1, but of a modified version of the frame, and FIGURE 3 is a perspective, fragmentary, sectional view of a canopy frame in a guide rail.

Referring to FIGURE 1, the canopy frame is formed in one piece and consists of sheet metal which is 1.1 mm. in thickness. It includes two substantially parallel, strip-like, side members 10 and 12 which are inter-connected by a front transverse member 14, a rear transverse member 18 and an intermediate transverse member 16. The members 10, 12, 14 and 18 form substantially a rectangle, the member 16 being substantially parallel with the members 14 and 18. Each member is strip-like and has a major surface facing upwardly. By way of stiffening, an upwardly pressed-out bead 19 of substantially semi-circular cross-section is formed in the member 18 over most of the length of the member 18 and a corresponding bead 17 is formed in the transverse member 16. The stiffening beads 17 and 19 do not extend over the entire width of the frame. On the contrary, a flat marginal strip $a$ remains at both longitudinal outer edges of the frame. This has the advantage that the frame can slide at the sides in guide rails the guiding spaces of which are as shallow as they would be if the frame had no beading. The frame shown can be slightly bent in the longitudinal direction for insertion in the guide rails, which substantially simplifies assembly. Since the beads 17 and 19 are pressed out upwardly, they do not interrupt the smooth finish of the lining situated on the underside of the frame.

In order to prevent the frame from rattling in its guide rails, the height of the marginal strips can be increased at at least one location, for example by the securing of separate pieces of material on the strips or by deformation of the members 10 and 12 as shown in FIGURES 1 and 3. FIGURE 3 shows a part of a U-section guide rail 32 on the upper flange 33 of which a guide shoe 35 of a sliding panel (not shown) slides, and between the lower flange 34 and the flange 33 of which the side member 12 of the frame is guided. The side member 12, which is shown in a fragmentary manner, is provided with an indentation in one major surface and with a corresponding projection 36 on the opposite major surface, which projection prevents vertical movement in the U-shaped guide-rail. The provision of this projection has no influence on the weight of the frame and does not even require a special working operation. As illustrated, the projections 36 are located at the rear edges of strips 10, 12 in a region adjacent strip 18, said projections having relatively slight extent in the longitudinal direction of strips 10, 12 and being limited to a zone immediately adjacent said rear edge.

All the corners of the frame which are formed by the meeting of the side members with the transverse members are stiffened by bevelling 20, and the inner edges of the frame are provided with bent-over flanges 21. Holes 15 in the form of slots are formed through the front transverse member 14, via which holes screws, clips or other securing means can extend for fixing the frame to a forward transverse reinforcing member of the sliding panel of the sliding roof.

The frame seen in FIGURE 2 is composed of individual members which are welded to one another. Therein front transverse member 24 (corresponding to the member 14), a central transverse member 26 (corresponding to the member 16) and a rear transverse member 28 (corresponding to the member 18) are welded to two side members 22 (corresponding to the members 10 and 12). Here also the central and rear transverse members are stiffened by upwardly pressed-out beads 27 and 29, respectively. Corner stiffeners in the form of short diagonal strips 30 are provided at the two rear corners, and the members 26 and 28 have bent-over edge portions 31.

Whereas in the versions shown in the drawings the frame is illustrated with no overall curvature, it could have any desired curvature to match the shape of the particular vehicle roof, in which case the curvature is retained, after mounting of the frame in the vehicle roof, by the stiffening profiling on the one hand, and the connection of the front transverse member to the sliding roof panel and the accommodation of the side members of the frame in guide rails, on the other hand

I claim:

A canopy frame for a panel adapted for sliding in guides in the roof of a motor vehicle, said frame being adapted for having a lining secured to the lower face thereof, said frame comprising an integral one piece assembly including first and second substantially parallel strip-like elements adapted for extending in said guides, and third and fourth substantially parallel strip-like elements integral with and extending normal to the first and second elements to confer a rectangular outline for said assembly with a central rectangular opening, a further integral strip-like element extending between the first and second elements and extending substantially parallel to the third and fourth elements and intermediate thereof to divide said opening into a pair of openings, said first and second elements being substantially flat and having smooth upper and lower surfaces whereby said elements can be inserted and slid in said guides, one of the third and fourth elements including an upwardly projecting bead portion constituting a reinforcement, said further element including an upwardly projecting bead portion also constituting a reinforcement, said bead portions substantially the entire length of the respecive elements but terminating in spaced relation from the first and second elements to leave the latter flat, the other of said third and fourth elements being flat and adapted for connection with said panel, said elements all having inner marginal edges bounding said opening and including upstanding flanges at said inner marginal edges extending continuously throughout the frame and bounding said openings, said first and second elements being substantially flat outside the inner marginal edges for being thereby adapted for being inserted and slid in the guide, while the overall assembly itself has a lower surface which is flat and smooth, said first and second strip-like elements respectively including an integral projection disposed at the edge thereof adjacent the reinforced one of said third and fourth elements, said projections having relatively slight extent length-wise of the first and second elements and being limited to a region immediately adjacent said edge thereof such that the projections prevent vertical movement of the elements in the guide.

References Cited by the Examiner

UNITED STATES PATENTS

| | | | |
|---|---|---|---|
| 2,550,323 | 4/1951 | Bishop | 296—137 |
| 2,973,990 | 3/1961 | Werner | 296—137 |
| 3,050,336 | 8/1962 | Werner | 296—137 |
| 3,078,122 | 2/1963 | Werner | 296—137 |

FOREIGN PATENTS 761,529    3/1934    France.

A. HARRY LEVY, *Primary Examiner.*